(12) United States Patent
An et al.

(10) Patent No.: US 11,859,661 B2
(45) Date of Patent: Jan. 2, 2024

(54) DEEP GROOVE BALL BEARING AND APPLICATIONS THEREOF

(71) Applicant: Aktiebolaget SKF, Gothenburg (SE)

(72) Inventors: Hongyuan An, Shanghai (CN); Yafen Chen, Shanghai (CN); Xinru Peng, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 66 days.

(21) Appl. No.: 17/885,499

(22) Filed: Aug. 10, 2022

(65) Prior Publication Data

US 2023/0047216 A1 Feb. 16, 2023

(30) Foreign Application Priority Data

Aug. 11, 2021 (CN) .......................... 202110919777.8

(51) Int. Cl.
*F16C 19/16* (2006.01)
*F16C 33/58* (2006.01)
*F16C 33/62* (2006.01)
*F16C 19/06* (2006.01)
*F16C 33/30* (2006.01)
*F16C 33/32* (2006.01)

(52) U.S. Cl.
CPC .............. *F16C 19/16* (2013.01); *F16C 19/06* (2013.01); *F16C 33/303* (2013.01); *F16C 33/32* (2013.01); *F16C 33/583* (2013.01); *F16C 33/62* (2013.01); *F16C 2240/70* (2013.01)

(58) Field of Classification Search
CPC ........ F16C 19/06; F16C 19/16; F16C 19/166; F16C 33/32; F16C 33/583; F16C 33/62; F16C 2206/40; F16C 2240/60; F16C 2240/70
See application file for complete search history.

(56) References Cited

U.S. PATENT DOCUMENTS

2013/0130849 A1* 5/2013 Takemura ............... F16C 19/06
474/43

FOREIGN PATENT DOCUMENTS

| JP | 2005195108 A | * | 7/2005 |
| JP | 2013124761 A | * | 6/2013 |
| WO | WO-2011155456 A1 | * | 12/2011 |
| WO | WO-2014119631 A1 | * | 8/2014 |

* cited by examiner

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

A deep groove ball bearing having an inner ring, an outer ring and a plurality of rolling elements set between the inner and outer rings. The rolling elements have a diameter $D_W \leq 0.5 H_1$, up to $D_W \leq 0.35 H_1$. $H_1$ is the radial dimension of the bearing in the sense of thickness and is numerically equal to half of the difference between the outer diameter and inner diameter of the bearing.

10 Claims, 1 Drawing Sheet

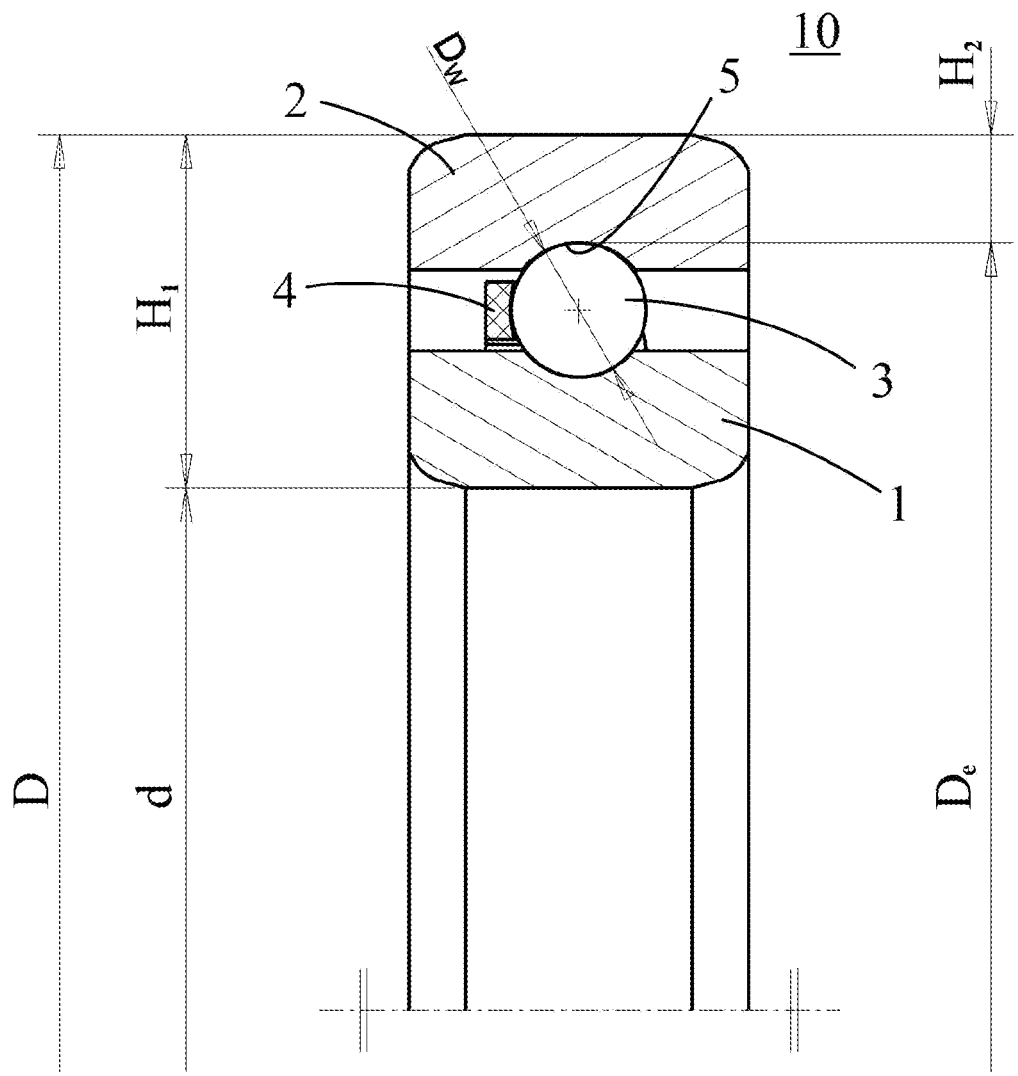

DEEP GROOVE BALL BEARING AND APPLICATIONS THEREOF

CROSS-REFERENCE TO RELATED APPLICATIONS

This application claims priority to Chinese Patent Application no. 202110919777.8, filed Aug. 11, 2021, the contents of which is fully incorporated herein by reference.

TECHNICAL FIELD

The invention relates to a deep groove ball bearing, in particular a deep groove ball bearing for use in electric motors.

BACKGROUND ART

Deep groove ball bearings are generally designed with the largest possible rolling elements (commonly known as "balls"). This is because the fatigue life of the material is negatively related to the load stress it is subjected to. Under the same load conditions, the larger the diameter of the rolling element, the larger the contact area between the rolling element and the raceway, the smaller the contact stress (intensity of pressure) between the two, the longer the fatigue life of the material. Fatigue life as a criterion is the traditional design concept in this field.

However, the actual life of a bearing often depends on more of other factors. Taking high-speed motor applications as an example, deep groove ball bearings are mainly in the regular light and medium load and medium and high speed state of operation, and the load stress they are subject to is far from the strength limit of the material. In this case, the design concept of stress minimization will result in excessive redundancy in bearing load capacity, but other aspects of performance such as rigidity, stability, speed, heat, vibration and noise often fall short of needs. In fact, these other factors are more often than not the main causes of system malfunctions or bearing failures.

Taking rigidity as an example, on the one hand, the maximization of the rolling element dimension compresses the radial thickness of the inner and outer ring of the bearing, resulting in a thin wall thickness with insufficient rigidity of the bearing rings. On the other hand, due to the limitation of bearing geometry, the number of larger-sized rolling elements that can be fitted into the bearing in the assembly process is less than the number of smaller-sized rolling elements, resulting in an increase in the circumferential spacing between the rolling elements, making it difficult for them to provide intensive support for the bearing rings. Both of these factors may lead to insufficient rigidity (especially axial rigidity) of the bearing, which in turn causes the following typical problems.

Insufficient rigidity will aggravate the dynamic deformation of the bearing rings caused by the contact load between the rolling elements and the bearing raceways, thus increasing the risk of creep (also named "creep deformation") between the inner ring and the rotating shaft and between the outer ring and the bearing house, which in turn will cause increased wear between the mating surfaces (the inner surface of the inner ring and the outer surface of the rotating shaft and the outer surface of the outer ring and the bore surface of the bearing house). On the one hand, wear debris can pose a serious threat to the sealing and lubrication of the bearing, which is an important cause of premature bearing failure. On the other hand, creep tends to cause relaxation of fit and stress mismatch between components, resulting in relative sliding between the outer ring and the bearing house, which can easily lead to systemic failure.

The reality calls for a deep groove ball bearing with balanced and comprehensive performance that can meet the needs of the widest range of applications in the field of high-speed motors.

SUMMARY OF THE INVENTION

To solve the above technical problems, the present invention provides a deep groove ball bearing comprising an inner ring, an outer ring and a plurality of rolling elements set between the inner and outer rings. The rolling elements have a diameter $D_W \leq 0.5H_1$, up to $D_W \leq 0.35H_1$, where $H_1$ is the radial dimension of the bearing in the sense of thickness, and is numerically equal to half of the difference between the outer diameter and inner diameter of the bearing.

By using sufficient number but smaller size of rolling elements, deep groove ball bearings can obtain enhanced axial and radial rigidity, which is not only conducive to reducing creep and wear of bearing mating surfaces, avoiding premature failure of bearings, but also improving the rotational accuracy of equipment, avoiding vibration, noise and other problems caused by insufficient bearing rigidity, fully meeting the comprehensive needs of rotating equipment for bearing performance.

On the basis of the above structure, the radial thickness of the bearing outer ring at the deepest position corresponding to the outer ring raceway (i.e., the minimum thickness of the outer ring) $H_2 \geq 0.25H_1$, up to $H_2 \geq 0.28H_1$, where $H_1$ is the radial dimension of the bearing in the sense of thickness, and is numerically equal to half of the difference between the outer diameter and inner diameter of the bearing.

Because of the tight fit between the shaft and the inner ring of the bearing, it can "compensate" for the lack of rigidity of the inner ring of the bearing to a sufficient extent. Therefore, increasing the radial thickness of the outer ring can enhance the rigidity of the bearing in a more significant sense, reduce the dynamic deformation of the outer ring and the bearing house caused by the contact load between the rolling elements and the outer raceway, and further reduce the risk of creep and wear on the mating surface.

Various specific embodiments and advantageous technical effects of the present invention are described in detail below with reference to the accompanying drawings.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. FIG. 1 shows a schematic cross-sectional view of a deep groove ball bearing according to the present invention.

DETAILED DESCRIPTION OF THE EMBODIMENT

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following description, terms indicating directions, such as "axial", "radial" and "circumferential direction", unless otherwise specified or delimited, refer to the axial, radial and circumferential directions of the bearing or its cage.

FIG. 1 shows a schematic cross-sectional view of the deep groove ball bearing according to the present invention. In the illustrated embodiment, the bearing 10 comprises an inner ring 1, an outer ring 2, a plurality of rolling elements 3 arranged between the inner and outer rings, and a cage 4 that constrains the rolling elements 3 to maintain a predefined circumferential spacing, where the rolling elements 3 can be made of a metallic material (e.g., bearing steel) or a ceramic material (e.g., silicon nitride). Ceramic materials have unique advantages in electric motor applications because they have many advantages such as heat resistance, corrosion resistance, electrical insulation, and non-magnetism, and, after they are made into rolling elements, can prevent magnetization and electrocorrosion of the bearings within the magnetic field of the motor.

As shown in FIG. 1, the bearing 10 has a radial dimension $H_1$ in the sense of thickness, which is numerically equal to half of the difference between the outer diameter D and the inner diameter d of the bearing, i.e. $H_1=(D-d)/2$. To improve the rigidity of the bearing, the invention is designed to use smaller size rolling elements so that the diameter of the rolling element $D_W$ does not exceed 50% of $H_1$, i.e. $D_W \leq 0.5H_1$. In a further preferred embodiment, the diameter of the rolling elements may be set to $D_W \leq 0.45H_1$, $D_W \leq 0.4H_1$, up to $D_W \leq 0.35H_1$ as desired. The smaller size of the rolling elements allows for a further increase in the density of rolling element distribution between the raceways, thus enhancing the rigid support of the bearing while also allowing room to improve the structural strength of the bearing rings, as described in detail later.

It is should be noted that the smaller size of the rolling elements also contributes to the increase of the bearing speed. On the one hand, due to the existence of clearance, a deep groove ball bearing in the working condition actually forms an angular contact ball bearing. During the rotation of the bearing, the centrifugal force will prompt the contact angle between the rolling element and the inner ring raceway and the contact angle between the rolling element and the outer ring raceway to be inconsistent. The resulting gyroscopic torque causes a self-spinning motion of the rolling element around its normal to the contact surface of the raceway, and this self-rotating motion is an important cause of frictional heating. The ratio of the angular velocity of self-spin to the angular velocity of rolling of the rolling element is called "spin-roll ratio". The larger the spin-roll ratio, the more violent the sliding friction, the more heat generated by the friction. Smaller size rolling elements are less subject to centrifugal force, resulting in a weaker self-spinning effect, a lower spin-roll ratio, and a weaker frictional heating effect than larger size rolling elements, and so are especially conducive to high-speed operation of the bearing. On the other hand, the smaller size of the rolling elements also gives way to internal space for the adoption of a cage of reinforced structure. It is well known that the structural strength of a cage can limit the increase in bearing speed. An enlarged space inside the bearing facilitates the adoption of a well-designed and structurally solid cage, which can enhance the upper limit of cage adaptation to bearing speed.

Based on the small size rolling elements, the invention can also be designed with a large size wall thickness of the bearing outer ring. Since the rigidity of the outer ring depends mainly on the wall thickness at its thinnest position, the invention uses the radial thickness $H_2$ of the outer ring 2 at the deepest part of the outer ring raceway 5 as the dimensional reference for describing the thickness of the outer ring (hereinafter referred to as "minimum thickness of the outer ring"). In the present invention, the minimum thickness of the outer ring $H_2 \geq 0.25H_1$; In a further preferred embodiment, the minimum thickness of the outer ring $H_2 \geq 0.27 H_1$; In a still further preferred embodiment, the minimum thickness of the outer ring $H_2 \geq 0.28H_1$.

As the shaft and bearing inner ring is generally in a tight fit, after assembly there will be a "compensation" effect on the rigidity of the inner ring, so that the outer ring thickness plays a more significant role than the inner ring in improving the rigidity of the bearing, which thus can significantly reduce the dynamic deformation of the bearing house caused by the contact load between the rolling elements and outer ring raceway.

As is well known, due to the limitation of geometry, the diameter of the bearing pitch circle and the size of the rolling elements determine the upper limit of the number of rolling elements that can be filled in between the inner and outer raceways of the bearing. Therefore, under the condition of the same pitch diameter, the smaller the size of the rolling elements, the more the number of rolling elements that can be filled into the bearing, the more rigid the bearing will be. At the same time, a larger number of rolling elements can alleviate to a considerable extent the increase in contact stress (intensity of pressure) between the rolling elements and the raceway due to size reduction, thus ensuring that the fatigue life of the material does not become a bottleneck limiting the bearing life.

To ensure the life and rigidity of the bearing, the deep groove ball bearing according to the present invention is designed with a sufficient number of small size rolling elements. Taking the typical application of motor bearings in electric vehicles as an example, bearing life is required to last at least 250,000-300,000 km vehicle mileage and the bearings are also required to have higher rigidity. According to the analysis and tests, in the case of rolling element diameter $D_W=0.35H_1$, when the number of rolling elements meet the following empirical relationship equation (1), not only does the bearing life meet the above mileage requirement, but the axial stiffness is also increased by about 15% compared to the conventional rolling element diameter and number:

$$Z \geq 1 + \frac{181}{2\arcsin\left(\frac{D_W}{D_e - D_W}\right)} \quad (1)$$

where Z is the number of rolling elements, $D_W$ is the diameter of the rolling elements, and $D_e$ is the diameter of the outer raceway.

As a further preferred embodiment, in the case of rolling element diameter $D_W=0.35H_1$, when the number of rolling elements meet the following empirical relationship equation (2), not only does the bearing life meet the above mileage requirement, but the axial stiffness is also increased by about 40% compared to the conventional rolling element diameter and number:

$$Z \geq 1 + \frac{185}{2\arcsin\left(\frac{D_W}{D_e - D_W}\right)} \quad (2)$$

While the load is constant, the increase in the number of rolling elements reduces the contact load between the individual rolling elements and the bearing raceways, which in turn reduces the dynamic deformation of the bearing rings caused by this contact load, thus significantly reducing the risk of creep and wear between the bearing outer ring and the bearing housing bore.

Starting from the motor applications of deep groove ball bearings, this invention opposes the traditional design concept of fatigue life as the criteria and replaces it with the pursuit of a comprehensive and balanced performance, so as to construct a bearing solution that can meet the needs of most motor applications by adopting relatively smaller size rolling elements, more number of rolling elements and relatively thick outer ring structure. In addition to the significant increase in bearing rigidity (including axial and radial rigidity), the smaller size of the rolling elements also reduces the self-spinning effect and the resulting thermal effect, and leaves room for the use of a cage of a stronger structure to increase the upper speed limit of the bearing.

The invention fully meets the comprehensive needs of motor applications for deep groove ball bearings, corrects the technical bias in the industry of unilaterally pursuing fatigue life and designing bearing structures accordingly, and reconstructs a comprehensive and balanced bearing index for motor applications. The invention is widely applicable to rotor support and torque output of various motors including those for electric vehicles, and fully meets the performance requirements of most applications in the motor field.

It should be understood by those skilled in the art that the described bearing and its applications are not limited by the specific embodiments and that the more general technical solutions will be subject to the limitations in the accompanying claims. Any modifications and improvements to the present invention are within the scope of protection of the present invention provided that they conform to the limitations of the accompanying claims.

The invention claimed is:

1. A deep groove ball bearing comprising:
    an inner ring,
    an outer ring, and
    a plurality of rolling elements set between the inner and outer rings, wherein
    the rolling elements have a diameter $D_W \leq 0.5H_1$, and wherein
    $H_1$ is the radial dimension of the bearing in the sense of thickness and is numerically equal to half of the difference between the outer diameter and inner diameter of the bearing.

2. The deep groove ball bearing according to claim 1, wherein the diameter of the rolling elements further satisfies the relationship equation $D_W \leq 0.45H_1$.

3. The deep groove ball bearing according to claim 2, wherein the diameter of the rolling elements further satisfies the relationship equation $D_W \leq 0.40H_1$.

4. The deep groove ball bearing according to claim 3, wherein the diameter of the rolling elements further satisfies the relationship equation $D_W \leq 0.35H_1$.

5. The deep groove ball bearing according to claim 1, wherein the outer ring has a minimum thickness $H_2 \geq 0.25H_1$.

6. The deep groove ball bearing according to claim 5, wherein the outer ring has a minimum thickness $H_2 \geq 0.27H_1$.

7. The deep groove ball bearing according to claim 6, wherein the outer ring has a minimum thickness $H_2 \geq 0.28H_1$.

8. The deep groove ball bearing according to claim 1, further comprises the number of the rolling elements satisfies the relationship equation:

$$Z \geq 1 + \frac{181}{2\arcsin\left(\frac{D_W}{D_e - D_W}\right)}$$

where Z is the number of the rolling elements, $D_W$ is the diameter of the rolling elements, and $D_e$ is the diameter of the outer raceway.

9. The deep groove ball bearing according to claim 8, wherein the number of the rolling elements further satisfies the relationship equation:

$$Z \geq 1 + \frac{185}{2\arcsin\left(\frac{D_W}{D_e - D_W}\right)}.$$

10. The deep groove ball bearing according to claim 1, wherein the rolling elements are made of ceramic material.

* * * * *